United States Patent
Wu et al.

(10) Patent No.: US 12,282,409 B2
(45) Date of Patent: Apr. 22, 2025

(54) THIRD-PARTY SERVICE AND APPLICATION DATA FOR QUALITY OF SERVICE

(71) Applicant: Juniper Networks, Inc., Sunnyvale, CA (US)

(72) Inventors: Xiaoying Wu, Sunnyvale, CA (US); Jisheng Wang, Palo Alto, CA (US); Prashant Kumar, Cupertino, CA (US); Pawan Gandhi, Pitampura (IN)

(73) Assignee: Juniper Networks, Inc., Sunnyvale, CA (US)

( * ) Notice: Subject to any disclaimer, the term of this patent is extended or adjusted under 35 U.S.C. 154(b) by 135 days.

(21) Appl. No.: 18/148,938

(22) Filed: Dec. 30, 2022

(65) Prior Publication Data
US 2024/0220389 A1 Jul. 4, 2024

(51) Int. Cl.
| | | |
|---|---|---|
| *G06F 15/16* | (2006.01) | |
| *G06F 11/07* | (2006.01) | |
| *G06F 11/34* | (2006.01) | |
| *H04L 67/53* | (2022.01) | |
| *H04L 67/60* | (2022.01) | |

(52) U.S. Cl.
CPC ........ *G06F 11/3466* (2013.01); *G06F 11/079* (2013.01); *H04L 67/53* (2022.05); *H04L 67/60* (2022.05)

(58) Field of Classification Search
CPC .... G06F 11/3466; G06F 11/079; H04L 67/53; H04L 67/60
USPC ........................................................ 709/219
See application file for complete search history.

(56) References Cited

U.S. PATENT DOCUMENTS

| | | |
|---|---|---|
| 8,661,295 B1 | 2/2014 | Khanna et al. |
| 9,729,439 B2 | 8/2017 | MeLampy et al. |
| 9,729,682 B2 | 8/2017 | Kumar et al. |

(Continued)

FOREIGN PATENT DOCUMENTS

| | | |
|---|---|---|
| EP | 3930271 A1 | 12/2021 |
| WO | 2013184846 A1 | 12/2013 |
| WO | 2022029465 A1 | 2/2022 |

OTHER PUBLICATIONS

Extended Search Report from counterpart European Application No. 23159323.7 dated Aug. 25, 2023, 11 pp.

(Continued)

*Primary Examiner* — Imad Hussain
(74) *Attorney, Agent, or Firm* — Shumaker & Sieffert, P.A.

(57) ABSTRACT

Techniques are disclosed for a network management system (NMS) that performs quality of service (QoS) monitoring and troubleshooting of user experience issues occurring outside of a network managed by the NMS using data obtained from third-party sources. For example, an NMS obtains third-party data of a third-party application server or third-party service provider server from a third-party monitoring vendor. The NMS identifies a user experience issue indicated by the third-party data and stitches the third-party data to network data received from network devices. The NMS determines a root cause or a remedial action of the user experience issue based at least on the network data received from the one or more network devices. The NMS generates a notification for presentation to an administrator device which identifies the root cause or the remedial action of the user experience issue.

20 Claims, 4 Drawing Sheets

(56) References Cited

U.S. PATENT DOCUMENTS

| | | | |
|---|---|---|---|
| 9,736,046 | B1 | 8/2017 | Jain et al. |
| 9,762,485 | B2 | 9/2017 | Kaplan et al. |
| 9,832,082 | B2 | 11/2017 | Dade et al. |
| 9,871,748 | B2 | 1/2018 | Gosselin et al. |
| 9,985,883 | B2 | 5/2018 | MeLampy et al. |
| 10,200,264 | B2 | 2/2019 | Menon et al. |
| 10,277,506 | B2 | 4/2019 | Timmons et al. |
| 10,432,522 | B2 | 10/2019 | Kaplan et al. |
| 10,439,915 | B2 | 10/2019 | O'Brien et al. |
| 10,623,285 | B1 | 4/2020 | Shevade et al. |
| 10,756,983 | B2 | 8/2020 | Ratkovic et al. |
| 10,819,593 | B1 | 10/2020 | Parthasarathy et al. |
| 10,958,537 | B2 | 3/2021 | Safavi |
| 10,958,585 | B2 | 3/2021 | Safavi |
| 10,985,969 | B2 | 4/2021 | Safavi |
| 10,992,543 | B1 | 4/2021 | Rachamadugu et al. |
| 11,075,824 | B2 | 7/2021 | McCulley et al. |
| 11,165,863 | B1 | 11/2021 | Timmons et al. |
| 11,496,373 | B2 | 11/2022 | Wu et al. |
| 2016/0337179 | A1 | 11/2016 | Rao |
| 2017/0005886 | A1* | 1/2017 | Dade ................. H04L 41/0604 |
| 2018/0091413 | A1 | 3/2018 | Richards et al. |
| 2018/0331946 | A1* | 11/2018 | Olofsson ................. H04L 45/22 |
| 2019/0068474 | A1 | 2/2019 | Vasseur et al. |
| 2020/0059856 | A1 | 2/2020 | Cui et al. |
| 2020/0204452 | A1* | 6/2020 | Bhat ................. H04L 41/0677 |
| 2020/0267047 | A1 | 8/2020 | Safavi |
| 2020/0336555 | A1 | 10/2020 | Bugenhagen et al. |
| 2020/0351172 | A1 | 11/2020 | Vasseur et al. |
| 2020/0366589 | A1 | 11/2020 | Kaplan et al. |
| 2020/0366590 | A1 | 11/2020 | Kaplan et al. |
| 2020/0366598 | A1 | 11/2020 | Kaplan et al. |
| 2020/0366599 | A1 | 11/2020 | Kaplan et al. |
| 2020/0403890 | A1 | 12/2020 | McCulley et al. |
| 2021/0176114 | A1 | 6/2021 | Hsu et al. |
| 2022/0066906 | A1 | 3/2022 | Kumar et al. |
| 2022/0278889 | A1 | 9/2022 | Malleshaiah et al. |
| 2022/0337495 | A1* | 10/2022 | Safavi ................. H04L 41/147 |
| 2023/0070701 | A1 | 3/2023 | Wang et al. |
| 2023/0128098 | A1 | 4/2023 | Agrawal et al. |
| 2023/0164029 | A1 | 5/2023 | Mermoud et al. |
| 2023/0217273 | A1* | 7/2023 | Viswambharan ..... H04W 12/61 370/242 |

OTHER PUBLICATIONS

U.S. Appl. No. 17/452,344, filed Oct. 26, 2021, by Agrawal et al.

U.S. Appl. No. 17/808,066, filed Jun. 21, 2022, by Kumar Mishra et al.

U.S. Appl. No. 18/155,658, filed Jan. 17, 2023, naming inventors Kumar et al.

Response to Extended Search Report dated Aug. 25, 2023, from counterpart European Application No. 23159323.7 filed Jan. 3, 2025, 67 pp.

* cited by examiner

US 12,282,409 B2

THIRD-PARTY SERVICE AND APPLICATION DATA FOR QUALITY OF SERVICE

TECHNICAL FIELD

This disclosure generally relates to computer networking.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, clients can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may form part of a cloud-based Wide-Area Network (WAN) assurance system that may support these services such that an administrator can easily create and manage these high-level network configuration services.

SUMMARY

In general, the disclosure describes techniques of an NMS to perform quality of service (QoS) monitoring and troubleshooting of user experience issues occurring outside of a network managed by the NMS using data obtained from third-party sources. For example, a third-party application performance monitoring (APM) vendor may generate third-party data regarding a third-party service or application. For example, the third-party APM vendor may collect user experience information from a user of the third-party service or application or conduct direct performance measurement of the third-party service or application. An NMS obtains third-party data of a third-party application server or third-party service provider server from a third-party APM vendor, e.g., via one or more Application Programming Interfaces (APIs). The NMS identifies a user experience issue indicated by the third-party data and stitches the third-party data to network data received from network devices, the network data generated substantially. In some examples, the NMS identifies a relevant portion of the network data received from network devices by determining a portion of the network data received from network devices that was generated substantially during the user experience issue indicated by the third-party data. The NMS determines a root cause or a remedial action of the user experience issue based at least on the network data received from the network devices. The NMS generates a notification for presentation to an administrator device which identifies the root cause or the remedial action of the user experience issue, thereby enabling resolution of the user experience issue, even where the root cause of the user experience issue occurs outside of the network managed by the NMS, such as where the root cause is located on a client device or third-party application server not managed by the NMS.

The techniques of the disclosure may provide specific improvements to the computer-related field of computer networking and traffic engineering that have practical applications. For example, the techniques of the disclosure may improve the ability of an NMS to perform troubleshooting and remediation of user experience issues with a network service, even where such issue occurs outside of the WAN managed by the NMS. Furthermore, the techniques described herein may improve the ability of the NMS to perform traffic engineering so as to improve network congestion, perform load balancing, and remediate issues, by informing the NMS of network conditions outside of the WAN managed by the NMS. This includes the behavior of end-users and third-party network devices, services, and/or applications that may be owned and/or associated with a different entity than NMS 130 such that NMS 130 does not receive, collect, or otherwise have access to network data of such third-party information, but nevertheless may use the techniques of the disclosure to remediate user experience issues caused by such third-party services and applications.

In one example, this disclosure describes a network management system in communication with a plurality of network devices, the network management system comprising: a memory; and processing circuitry in communication with the memory and configured to: obtain third-party data of one or more third-party application servers or third-party service provider servers from one or more third-party APM vendors; identify a user experience issue indicated by the third-party data; stitch the third-party data indicative of the user experience issue to network data received from one or more network devices of the plurality of network devices; determine at least one of a root cause or a remedial action of the user experience issue based at least on the network data received from the one or more devices; and generate a notification for presentation to an administrator device, the notification identifying the at least one of the root cause or the remedial action of the user experience issue.

In another example, this disclosure describes a method comprising: obtaining, by a network management system in communication with a plurality of network devices, third-party data of one or more third-party application servers or third-party service provider servers from one or more third-party monitoring vendors; identifying, by the network management system, a user experience issue indicated by the third-party data; stitching, by the network management system, the third-party data indicative of the user experience issue to network data received from one or more network devices of the plurality of network devices; determining, by the network management system, at least one of a root cause or a remedial action of the user experience issue based at least on the network data received from the one or more devices; and generating, by the network management system, a notification for presentation to an administrator device, the notification identifying the at least one of the root cause or the remedial action of the user experience issue.

In another example, this disclosure describes a non-transitory, computer-readable medium comprising instructions that, when executed, are configured to cause processing circuitry of a network management system in communication with a plurality of network devices to: obtain third-party data of one or more third-party application servers or third-party service provider servers from one or more third-party monitoring vendors; identify a user experience issue indicated by the third-party data; stitch the third-party data indicative of the user experience issue to network data received from one or more network devices of the plurality of network devices; determine at least one of a root cause or a remedial action of the user experience issue based at least on the network data received from the one or more devices; and generate a notification for presentation to an administrator device, the notification identifying the at least one of the root cause or the remedial action of the user experience issue.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
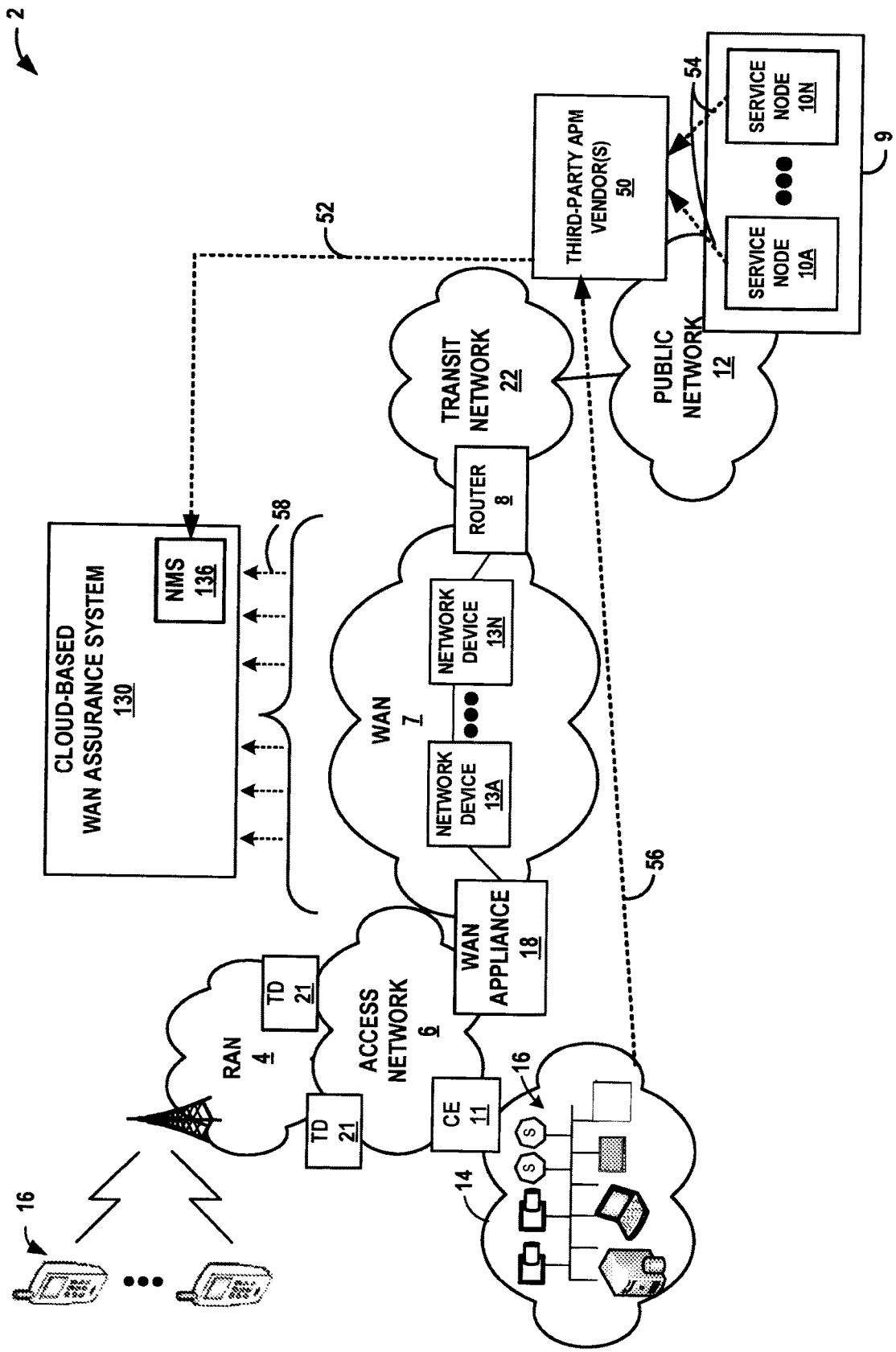
FIG. 1 is a block diagram of an example computer network system in accordance with the techniques of the disclosure.

In general, the disclosure describes techniques of an NMS to perform quality of service (QoS) monitoring and/or troubleshooting of user application experiences outside of the network monitored by the NMS. A conventional NMS performs client-to-cloud monitoring and/or troubleshooting solutions of a network, such as a WLAN or WAN. The NMS gathers telemetry data from devices, e.g., client devices, APs, switches, gateways, within the network to build a graph database of the network. The graph database comprises entity information as nodes of the graph and connectivity information as edges of the graph. An NMS may use telemetry, uplink data within the network monitored by the NMSm or other types of data to detect third-party devices connected to network devices within the network. However, a conventional NMS may lack insight into both the "first mile" of the user application experience, e.g., at the client device, and the "last mile" of the user application experience, e.g., past the WAN from the service provider to the application server.

Techniques are disclosed for an NMS to perform QoS monitoring and/or troubleshooting of the "first mile" of the user application experience, e.g., at the client device prior to the WLAN managed by the NMS, and/or the "last mile" of the user application experience, e.g., past the WAN managed by the NMS from the service provider to the application server.

With respect to the "last mile" of the user application experience, an NMS as described herein integrates with third-party application/service performance monitoring (APM) vendors to obtain data and/or intelligence associated with third-party devices (e.g., the Internet service provider (ISP) or the software-as-a-service (SaaS) application server). For example, in a client-to-cloud application session topology, a client device may interface with a wireless network, which in turn may be in communication with a wired network. The wired network may be in communication with a WAN. The WAN may interface with a service provider network provided by an ISP, which in turn provides connectivity to a third-party Software as a Service (SaaS) application server which provides an instance of an application to the client device. The NMS as described herein may provide QoS monitoring and/or troubleshooting of one or more of the wireless network, wired network, WLAN, and past the WAN from the service provider to the application server.

With respect to the "first mile" of the user application experience, the NMS integrates with third-party APM vendors to obtain data from the SaaS application server during an application session between a client device and the SaaS application server. In this example, the data is associated with how the client device is behaving during the application session or other usage of the application. The NMS may also receive user QoS data in the form of low-level application details from the third-party APM vendors of the SaaS application servers. The NMS may determine whether Service-Level Agreement (SLA) requirements of the network are met based on the low-level application details on the network.

The NMS may further receive user feedback data on a particular application session from the third-party APM vendors of the SaaS application servers. The NMS may use the problematic application session indicated by the user feedback data as part of a root cause analysis of the entire network.

In any of the above examples, the NMS stitches the data obtained from the third-party APM vendors of the ISP and/or the SaaS application servers to the telemetry data received from the network devices within the network(s) managed by the NMS (e.g., the WAN and WLAN in the foregoing example). For example, based on the data obtained from the third-party APM vendors, the NMS may learn of a user experience issue. The NMS then uses a graph database built based on the WAN and WLAN telemetry data to determine where the problem occurred on the full network and how the problem can be remediated. In this way, the NMS provides a single pane of glass to present information to administrators regardless of the source of the data. Expanding the collection of data to those devices and services outside of the network(s) managed by the NMS provides additional potential components that may be the root cause of a detected network problem. In addition, the application client data provides data on the user-perceived judgment of the quality of particular application sessions or calls, which is beneficial in identifying user experience issues.

Using the co-relation of the telemetry data from wireless, wired and SD-wan along with the third-party data, the NMS may have the full view of: (1) what happened (e.g., via user feedback and/or analysis by the NMS); (2) when it happened (e.g., via third-party data); (3) where it happened (e.g., via analysis by the NMS); (4) why it happened (e.g., via analysis by the NMS); and/or (5) how to remediate the issue (e.g., via the conversational assistant or remedies identified by the NMS). Therefore, an NMS as described herein may stitch data received from third-party APM vendors to the telemetry data received from the WAN and WLAN managed by the NMS to provide full client-to-cloud monitoring and/or troubleshooting, including the first mile and the last mile of user experience. An NMS as described herein therefore may expand its collection of data to those devices and services outside of the WLAN and WAN managed by the NMS, so as to enable the NMS to gain insight on additional potential components that may be the root case of a detected network problem and to enable true client-to-cloud monitoring and troubleshooting.

FIG. 1 is a block diagram of an example network system 2 in accordance with the techniques of the disclosure. In the illustrated example of FIG. 1, a service provider network 2 operates as a private network to provide packet-based network services to subscriber devices 16 (also referred to herein as "client devices 16"). That is, service provider network 2 provides authentication and establishment of network access for subscriber devices 16 such that a subscriber device may begin exchanging data packets with public network 12, which may be an internal or external packet-based network such as the Internet.

Service provider network 2 comprises access network 6 that provides connectivity to public network 12 via service provider wide area network 7 (hereinafter, "WAN 7") and router 8. WAN 7 and public network 12 provide packet-based services that are available for request and use by subscriber devices 16. As examples, WAN 7 and/or public network 12 may provide bulk data delivery, voice over Internet protocol (VOIP), Internet Protocol television (IPTV), Short Messaging Service (SMS), Wireless Application Protocol (WAP) service, or customer-specific application services. In some examples, WAN 7 is a software-defined wide area network (SD-WAN). Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPV6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or data center 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions for customer network 14. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of service provider network 2 via a radio access network (RAN) 4. Example mobile subscriber devices include mobile telephones, laptop or desktop computers having, e.g., a wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as radio access network (RAN) 4. Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

A WAN appliance 18 may be a customer edge (CE) router, a provider edge (PE) router, or other network device between access network 6 and WAN 7. WAN 7 offers packet-based connectivity to subscriber devices 16 attached to access network 6 for accessing public network 12 (e.g., the Internet). WAN 7 may represent a public network that is owned and operated by a service provider to interconnect a plurality of networks, which may include access network 6. In some examples, WAN 7 may implement Multi-Protocol Label Switching (MPLS) forwarding and in such instances may be referred to as an MPLS network or MPLS backbone. In some instances, WAN 7 represents a plurality of interconnected autonomous systems, such as the Internet, that offers services from one or more service providers. WAN 7 may include network devices 13A-13N (hereinafter, "network devices 13"), including WAN appliance 18 and router 8, that forward application traffic on WAN links within WAN 7. Public network 12 may represent the Internet. Public network 12 may represent an edge network coupled to WAN 7 via a transit network 22 and one or more network devices, e.g., a customer edge device such as customer edge switch or router. Public network 12 may include a data center. Router 8 may facilitate the exchange of packets between WAN appliance 8 and service nodes 10A-10N (hereinafter, "service nodes 10") via transit network 22 and public network 12.

In some examples, service nodes 10 are one or more third-party application servers or third-party service provider servers that provide a third-party service to subscriber devices 16. As described herein, a "third-party" device, such as third-party service nodes 10, is a device outside of WAN 7 that is managed by a third-party, and, as such, NMS 136 has limited or no ability to directly configure, control, or receive information related to the operation of such third-party devices.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VOIP, video and multimedia services, and security services. As described above with respect to WAN 7, WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as WAN appliance 18 or router 8. In turn, WAN appliance 18 may access a central server (not shown) such as an Authentication, Authorization and Accounting (AAA) server to authenticate the subscriber devices 16 requesting network access. Once authenticated, any of subscriber devices 16 may send subscriber data traffic toward WAN 7 to access and receive services provided by public network 12, and such packets may traverse router 8 as part of at least one packet flow. In some examples, WAN appliance 18 may forward all authenticated subscriber traffic to public network 12, and router 8 may apply services and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services executing on one or more service cards installed within data center 9. In addition, or alternatively, service provider network 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after WAN appliance 18 has authenticated and established access sessions for the subscribers, WAN appliance 18 or router 8 may direct packet flows for the subscribers along the appropriate service tunnels, thereby causing data center 9 to apply the requisite ordered services for the given subscriber. In some examples, a centralized controller (not shown) may also provide a forwarding rule set to WAN appliance 18 or router 8 for managing the forwarding path. In some examples, the SDN controller manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, service provider network 2 comprises a software defined network (SDN) and network functions virtualization (NFV) architecture. An SDN controller (not shown in FIG. 1) may provide a high-level controller device for configuring and managing the routing and switching infrastructure of service provider network 2. NFV orchestrator device (not shown in FIG. 1) may provide a high-level orchestrator for configuring and managing virtualization of network services into service nodes 10 of data center 9. In some instances, the SDN controller manages deployment of virtual machines (VMs) within the operating environment of data center 9. For example, the SDN controller may interact with provider edge (PE) router 8 to specify service chain information. For example, the service chain information provided by the SDN controller may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

Cloud-based WAN assurance system 130 provides WAN assurance services to WAN 7. In some examples, cloud-based WAN assurance system 130 provides monitoring and analytics for network devices 13. Cloud-based WAN assurance system 130 includes network management system (NMS) 136 which may provide machine-learning based analytics of data collected by cloud-based WAN assurance system 130.

In accordance with the techniques described herein, NMS 136 of cloud-based WAN assurance system 130 performs QoS monitoring and troubleshooting of user experience issues occurring outside of WAN 7 managed by NMS 136 using third-party data 52 obtained from one or more third-party APM vendors 50.

For example, third-party APM vendor 50 generates third-party data 52 regarding a third-party service or application. For example, third-party APM vendor 50 may collect user experience information 56 from a user of the third-party service or application provided by service nodes 10. In some examples, third-party APM vendor 50 provides a website with which a user or subscriber devices 16 may send reports 56 of user experience issues with a service provided by service nodes 10, such as a service outage, a network connectivity issue, etc. As another example, third-party APM vendor 50 may conduct direct performance measurement of third-party service or applications provided by service nodes 10 so as to obtain performance measurement data 54 of the third-party service or applications. In some examples, third-party APM vendor 50 may perform "speed testing," by measuring characteristics of a network or service performance of service nodes 10, such as latency, bandwidth, jitter, delay, response time, etc.

NMS 136 obtains third-party data 52 of a third-party application server or third-party service provider server from third-party APM vendor 50. In some examples, NMS 136 may use one or more APIs to query third-party APM vendor 50 for data 52. In some examples, NMS 136 obtains third-party data 52 from third-party APM vendor 50 using a "pull" or "push" request methodology.

NMS 136 identifies a user experience issue indicated by the third-party data 52. For example, NMS 136 may identify a user experience issue based on a determination that one or more users of subscriber devices 16 have submitted reports 56 indicative of an issue with a third-party service provided by third-party service nodes 10. As another example, NMS 136 may identify a user experience issue based on a determination that one or more metrics of third-party service nodes 10 indicated by third-party data 52 fail to meet one or more performance requirements established by one or more Service-Level Agreements (SLAs).

In response to identifying a user experience issue indicated by third-party data 52, NMS 136 obtains network data 58 received from network devices 13. NMS 136 stitches (or fuses) third-party data 52 to the obtained network data 58 received from network devices 13. In some examples, NMS 136 identifies a relevant portion of network data 58 received from network devices 13 by determining a portion of network data 58 received from network devices 13 that was generated at a time substantially similar to a time at which the user experience issue indicated by the third-party data occurred. For example, NMS 136 may determine a time at which the user experience issue indicated by third-party data 52 occurred, and obtain network data 58 prior to, during, and after the time at which the user experience issue indicated by third-party data 52 occurred. Furthermore, in some examples, NMS 136 may create a log for the user experience issue that includes both the third-party data 52 and the network data 58. In some examples, NMS 136 processes at least network data 58 to determine a root cause of the user experience issue. Additionally, or in the alternative, NMS 136 processes at least network data 58 to further determine to a remedial action of the user experience issue. In some examples, NMS 136 processes both third-party data 52 and network data 58 to determine the root cause or remedial action of the user experience issue.

For example, NMS 136 may determine, based on network data 58, that a root cause of the user experience issue is due to degraded performance or failure of a service provided by, e.g., service node 10A. In response to the determination, NMS 136 may determine a remedial action is to select a different interface of router 8 with which to forward traffic of subscriber devices 16 such that a different service node, such as service node 10B, is used to provide the service to subscriber devices 16.

As another example, NMS 136 may determine, based on network data 58, that a root cause of the user experience issue is due to degraded performance or failure of a service provider network of an ISP providing connectivity through transit network 22 to service node 10A. In response to the determination, NMS 136 may determine a remedial action is to cause router 8 to forward traffic of subscriber devices 16 via a different service provider network (e.g., such that the traffic of subscriber devices 16 passes through a different transit network 22) so as to avoid the problematic service provider network.

NMS 136 generates a notification for presentation to an administrator device which identifies the root cause or the remedial action of the user experience issue. In this fashion, NMS 136 may enable troubleshooting, identification, and resolution of the user experience issue, even where the root cause of the user experience issue occurs outside of WAN 7 managed by NMS 136, such as where the root cause is located on one of subscriber devices 16 or third-party application service node 10 not managed by NMS 136.

Figure 2:
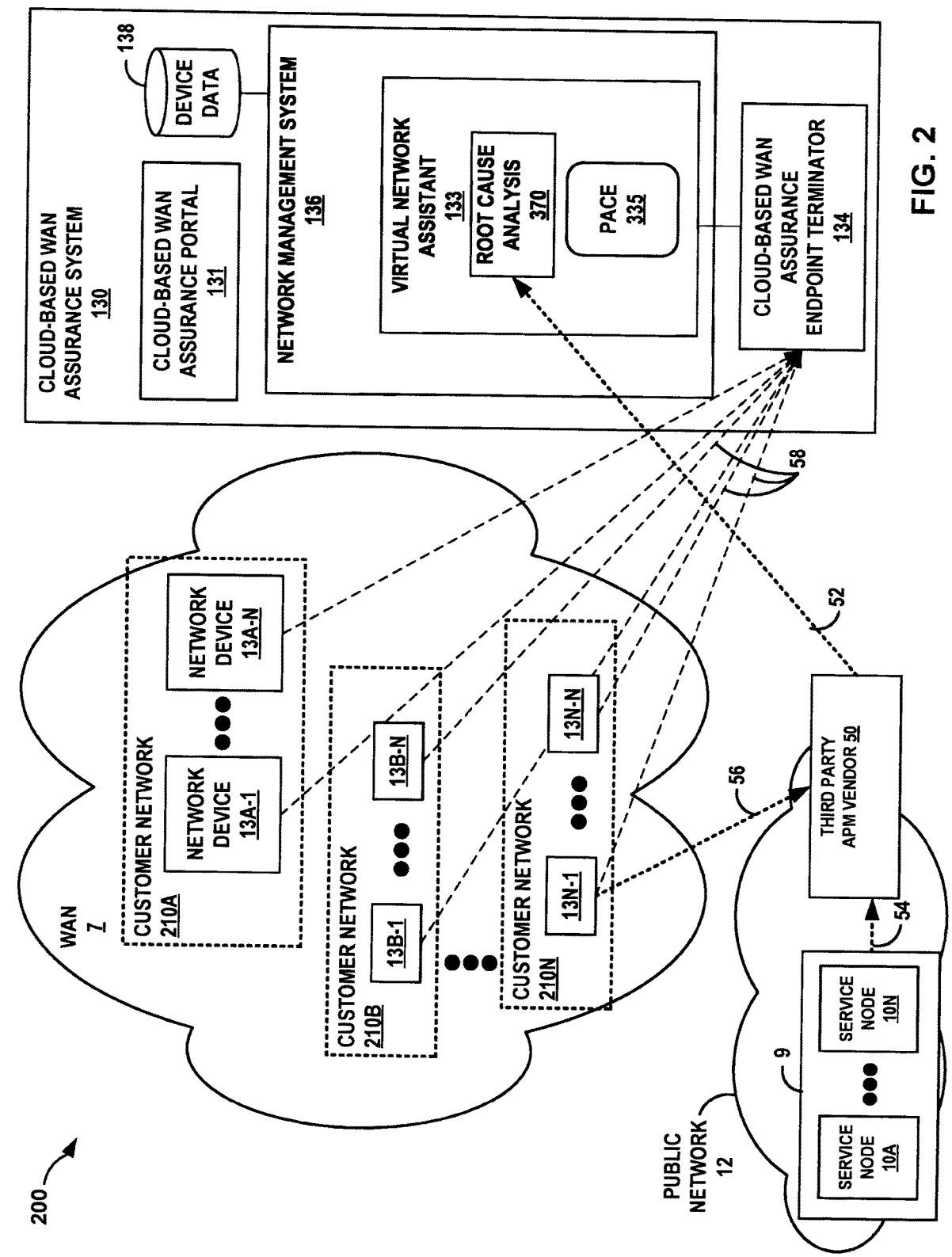
FIG. 2 is a block diagram illustrating another example computer network system in accordance with the techniques of the disclosure.

FIG. 2 is a block diagram illustrating an example computer network system 200 in accordance with the techniques of the disclosure. Cloud-based WAN assurance system 130 is a cloud-based microservices system. In some examples, each of network devices 13 is an example of one of network devices 13 of FIG. 1 and cloud-based WAN assurance system 130 is an example of cloud-based WAN assurance system 130 of FIG. 1.

In the example of FIG. 2, WAN 7 includes a plurality of customer networks 210A-210N (hereinafter, "customer networks 210"). Each customer network 210 includes network devices 13A-13N (hereinafter, "network devices 13"). For example, customer network 210A includes network devices 13A-1 to 13A-N, customer network 210B includes network devices 13B-1 to 13B-N, and customer network 210N includes network devices 13N-1 to 13N-N. Each customer network 210 may have a different network topology and a different amount or type of network devices 13 than each other customer network 210. Furthermore, customer networks 210 may have varying purposes and behavior, and may be commercial, enterprise, or residential networks.

Cloud-based WAN assurance system 130 provides a cloud service that brings automated operations and service levels to the enterprise access layer for the WAN edge, and when used in conjunction with wired and wireless Assurance, transforms all operations covering the switches, IoT devices, access points, servers, printers, etc. Gateways provide rich streaming telemetry data that enable the insights for gateway health metrics and anomaly detection. Network devices 13 provide streaming data to cloud-based WAN assurance system 130, which may include telemetry data, SLE metrics, and/or traffic metrics including application usage data, and health information, etc.

In some examples, the streamed data includes data relating to application response times and WAN link and gateway health measurements. For gateway health, data can include, for example, CPU utilization, memory utilization, link utilization, temperature, fan, power. For WAN link health, data can include, for example, IPSec information, routing protocols information, and WAN interface information. Application experience information can include, for example, latency, jitter, packet loss, roundtrip times, and other metrics, on a per-application basis.

WAN insights driven by AI: For physical network devices, the WAN insights show exactly how network devices are performing with detailed network device metrics and insights down to the port level such as CPU, memory utilization, bytes transferred, traffic utilization, and power draw. WAN Assurance also logs network device events, like configuration changes and system alerts. Along with WAN utilization, IPSec utilization insights and Secure Vector Routing (SVR) utilization insights can help understand the amount of traffic sent over IPSec tunnels versus local breakout, where IPSec tunnels or SVR session-based routing are in use, respectively. WAN insights also provide application visibility on a per user as well as per app basis. In combination with the tenant information and session-aware router capabilities described above, WAN insights can provide application visibility on a per tenant, per application basis.

Additional information with respect to WAN insights, SVR insights and performance monitoring is described in U.S. Patent Application Publication No. 2020/0403890, entitled "IN-LINE PERFORMANCE MONITORING," published on Dec. 24, 2020; U.S. Patent Publication No. 10,200,264, entitled "LINK STATUS MONITORING BASED ON PACKET LOSS DETECTION," issued on Feb. 5, 2019; and U.S. patent application Publication Ser. No. 17/808,066, entitled "LINK BEHAVIOR PREDICTION FOR USE IN PATH SELECTION," filed Jun. 21, 2022, the entire content of each of which is incorporated herein by reference in its entirety.

In operation, NMS 136 observes, collects and/or receives event data, which may take the form of data extracted from messages, counters and statistics, for example. NMS 136 may comprise one or more computing devices, dedicated servers, virtual machines, containers, services or other forms of environments for performing the techniques described herein. Similarly, computational resources and components implementing virtual network assistant (VNA) 133 and proactive analytics and correlations engine (PACE) 335 may be part of the NMS 136, may execute on other servers or execution environments, or may be distributed to nodes within a network (e.g., routers, switches, controllers, gateways and the like).

To ensure a high Service Level Experience (SLE), NMS 136 employs methods to detect faults in real-time and to even predictively detect faults before a user notices the fault(s). These methods may also be used for ensuring a particular level of application quality of experience (AppQoE).

Example fault detection systems having aspects that may be employed by NMS 136 are described in U.S. Pat. No. 10,958,585, entitled "METHODS AND APPARATUS FOR FACILITATING FAULT DETECTION AND/OR PREDICTIVE FAULT DETECTION," issued on Mar. 23, 2021; U.S. Pat. No. 9,832,082, entitled "MONITORING WIRELESS ACCESS POINT EVENTS," issued on Nov. 28, 2017; U.S. Pat. No. 10,958,537, entitled "METHOD FOR SPATIO-TEMPORAL MONITORING," issued on Mar. 23, 2021; and U.S. Pat. No. 10,985,969, entitled "SYSTEMS AND METHODS FOR A VIRTUAL NETWORK ASSISTANT," issued on Apr. 20, 2021, the entire contents of each of which are incorporated by reference herein.

In some examples, VNA 133 of NMS 136 may apply machine learning techniques to identify the root cause of error conditions detected or predicted from the streams of event data. If the root cause may be automatically resolved, VNA 133 invokes one or more corrective actions to correct the root cause of the error condition, thus automatically improving the underlying SLE metrics and also automatically improving the user experience. Further example details of root cause analysis and automatic correction techniques that may be performed by NMS 136 are described in U.S. patent application Ser. No. 17/303,222, entitled "VIRTUAL NETWORK ASSISTANT HAVING PROACTIVE ANALYTICS AND CORRELATION ENGINE USING UNSUPERVISED ML MODEL," filed May 24, 2021, 2021, the entire contents of which are incorporated by reference herein.

Although the techniques of the present disclosure are described in this example as performed by NMS 136 of cloud-based WAN assurance system 130, techniques described herein may be performed by any other computing device(s), system(s), and/or server(s), including for purposes other than WAN assurance, and this disclosure is not limited in this respect. For example, one or more computing device(s) configured to execute the functionality of the techniques of this disclosure may reside in a dedicated server or be included in any other server in addition to or other than cloud-based WAN assurance system 130, or may be distributed throughout network system 200, and may or may not form a part of cloud-based WAN assurance system 130.

In some examples, network devices 13 (e.g., routers or switches) or even access points (not shown) may be configured to locally construct, train, apply and retrain unsupervised ML model(s) based on locally collected SLE metrics to determine whether the collected network event data should be discarded or whether the data represents anomalous behavior that needs to be forwarded to NMS 136 for further root cause analysis by a virtual network assistant (FIG. 2) to facilitate identification and resolution of faults.

In accordance with the techniques described herein, VNA 133 of NMS 136 performs QoS monitoring and troubleshooting of user experience issues occurring outside of WAN 7 managed by NMS 136 using third-party data 52 obtained from one or more third-party monitoring vendors 50.

For example, third-party APM vendor 50 generates third-party data 52 regarding a third-party service or application. For example, third-party APM vendor 50 may collect user experience information 56 from a user of the third-party service or application provided by service nodes 10. In some examples, third-party APM vendor 50 provides a website with which a user or subscriber devices 16 may send reports 56 of user experience issues with a service provided by service nodes 10, such as a service outage, a network connectivity issue, etc. As another example, third-party APM vendor 50 may conduct direct performance measurement of the third-party service or applications to obtain performance measurement data 54. In some examples, third-party APM vendor 50 may perform "speed testing," by measuring characteristics of a network or service performance of service nodes 10, such as latency, bandwidth, jitter, delay, response time, etc.

Root cause analysis 370 obtains third-party data 52 of a third-party application server or third-party service provider server from third-party APM vendor 50. In some examples, root cause analysis 370 may use one or more APIs to query third-party APM vendor 50 for data 52. In some examples, root cause analysis 370 obtains third-party data 52 from third-party APM vendor 50 using a "pull" or "push" request methodology.

While the techniques of the disclosure refer to obtaining third-party data 52 from third-party APM vendors 50, in some examples, root cause analysis 370 may query a third-party service provider or third-party application server directly to obtain third-party data 52. In this example, root cause analysis 370 may obtain third-party data 52 from the third-party service provider or third-party application server in a substantially similar way as described herein with respect to obtaining third-party data 52 from third-party APM vendor 50. For example, root cause analysis 370 may use one or more APIs to query the third-party service provider or third-party application server for third-party data 52. In some examples, root cause analysis 370 obtains third-party data 52 from the third-party service provider or third-party application server using a "pull" or "push" request methodology.

In some examples, third-party data 52 comprises insights data of one or more of a service provider network of an ISP, a Software-as-a-Service (SaaS) application service (e.g., provided by third-party service nodes 10), or a custom application hosted in a datacenter of the one or more third-party APM vendors 50. In some examples, the insights data may include data specifying one or more of a user experience issue for a session between a client or subscriber device 16 and a service provided by third-party service nodes 10; one or more root causes of the user experience issue; configuration information for the client or subscriber device 16, the service provided by third-party service nodes 10, or one of third-party service nodes 10; or various performance metrics for the service provided by third-party service nodes 10, or one of third-party service nodes 10.

In some examples, root cause analysis 370 performs on-demand third-party integration for troubleshooting and root cause analysis of a user experience issue. In some examples, root cause analysis 370 receives a request for troubleshooting of the user experience issue, from, e.g., an administrator. In response to the request, root cause analysis 370 queries third-party APM vendor 50 via one or more APIs for third-party data 52 of one or more third-party service nodes 10 or service provider networks.

In some examples, root cause analysis 370 periodically queries third-party APM vendor 50 via one or more APIs for third-party data 52 of one or more third-party service nodes 10. For example, root cause analysis 370 periodically queries third-party APM vendor 50 once per second, once per minute, once per hour, once per day, etc.

In some examples, root cause analysis 370 queries third-party APM vendor 50 via one or more APIs for third-party data 52 of a particular third-party application server, e.g., service node 10A, during an application session between a specific client or subscriber device 16 and the particular third-party service node 10A. In some examples, third-party data 52 may include data associated with a behavior of the specific client or subscriber device 16 during the application session with third-party service node 10A.

In some examples, root cause analysis 370 queries third-party APM vendor 50 via one or more APIs for third-party data 52 of a particular third-party application server, e.g., service node 10A, after an application session between a specific client or subscriber device 16 and the particular third-party service node 10A has concluded. In some examples, third-party data 52 includes user QoS data in the form of low-level application details. In some examples where the application session is a videoconference session, the low-level application details include application-specific bandwidth usage by, e.g., an audio call; jitter and/or latency comparisons across audio, video, or screen share calls from a particular user, third-party APM vendor 50, or SaaS application servers 10. In some examples, the user QoS data may be divided by modalities, e.g., audio, video, or screen share. As described in more detail below, NMS 136 may use the low-level application details to determine whether SLA requirements of the network are met. In some examples, third-party data 52 includes user feedback data on the application session.

Root cause analysis 370 identifies a user experience issue indicated by the third-party data 52. For example, root cause analysis 370 may identify a user experience issue based on a determination that one or more users of subscriber devices 16 have submitted reports 56 indicative of an issue with a third-party service provided by third-party service nodes 10. As another example, root cause analysis 370 may identify a user experience issue based on a determination that one or more metrics of third-party service nodes 10 indicated by third-party data 52 fail to meet one or more performance requirements established by one or more SLAs.

In response to identifying a user experience issue indicated by third-party data 52, root cause analysis 370 stitches (or fuses) third-party data 52 to the obtained network data 58 received from network devices 13. In some examples, NMS 136 identifies a relevant portion of network data 58 received from network devices 13 by determining a portion of network data 58 received from network devices 13 that was generated at a time substantially similar to a time at which the user experience issue indicated by the third-party data occurred. For example, root cause analysis 370 obtains, via endpoint terminator 134, network data 58 received from network devices 13. In some examples, network data 58 is generated during the user experience issue. For example, root cause analysis 370 may determine a time at which the user experience issue indicated by third-party data 52 occurred, and obtain network data 58 that was generated prior to, during, and after the time at which the user experience issue indicated by third-party data 52 occurred. In some examples, root cause analysis 370 may obtain data that has been generated during a predetermined time span prior to and after the time at which the user experience issue indicated by third-party data 52 occurred. In some examples, the predetermined time may be 1 second, 1 minute, 10 minutes, 30 minutes, 1 hour, 1 day, etc. In some examples, root cause analysis 370 may obtain network data 58 during or at a substantially same time as the user experience issue is occurring. In some examples, root cause analysis 370 may obtain network data 58 after the user experience issue has occurred. In some examples, root cause analysis 370 may create a log for the user experience issue that includes both the third-party data 52 and the network data 58.

Root cause analysis 370 processes at least network data 58 to determine a root cause of the user experience issue. In some examples, the root cause is due to a problem with at least one of the client or subscriber device 16 or the particular third-party application service node 16 (e.g., devices that are external to WAN 7 and not managed by NMS 136). Additionally, or in the alternative, root cause analysis 370 processes at least network data 58 to further determine to a remedial action of the user experience issue. In some examples, root cause analysis 370 processes both third-party data 52 and network data 58 to determine the root cause or remedial action of the user experience issue.

For example, root cause analysis 370 may determine, based on network data 58, that a root cause of the user experience issue is due to degraded performance or failure of a service provided by, e.g., service node 10A. In response to the determination, root cause analysis 370 may determine a remedial action is to select a different interface of router 8 with which to forward traffic of subscriber devices 16 such that a different service node, such as service node 10B, is used to provide the service to subscriber devices 16.

As another example, root cause analysis 370 may determine, based on network data 58, that a root cause of the user experience issue is due to degraded performance or failure of a service provider network of an ISP providing connectivity through transit network 22 to service node 10A. In response to the determination, root cause analysis 370 may determine a remedial action is to cause router 8 to forward traffic of subscriber devices 16 via a different service provider network (e.g., such that the traffic of subscriber devices 16 passes through a different transit network 22) so as to avoid the problematic service provider network.

Virtual network assistant 133 generates a notification for presentation to an administrator device which identifies the root cause or the remedial action of the user experience issue. In this fashion, virtual network assistant 133 may enable troubleshooting, identification, and resolution of the user experience issue, even where the root cause of the user experience issue occurs outside of WAN 7 managed by NMS 136, such as where the root cause is located on one of subscriber devices 16 or third-party application service node 10 not managed by NMS 136.

Figure 3:
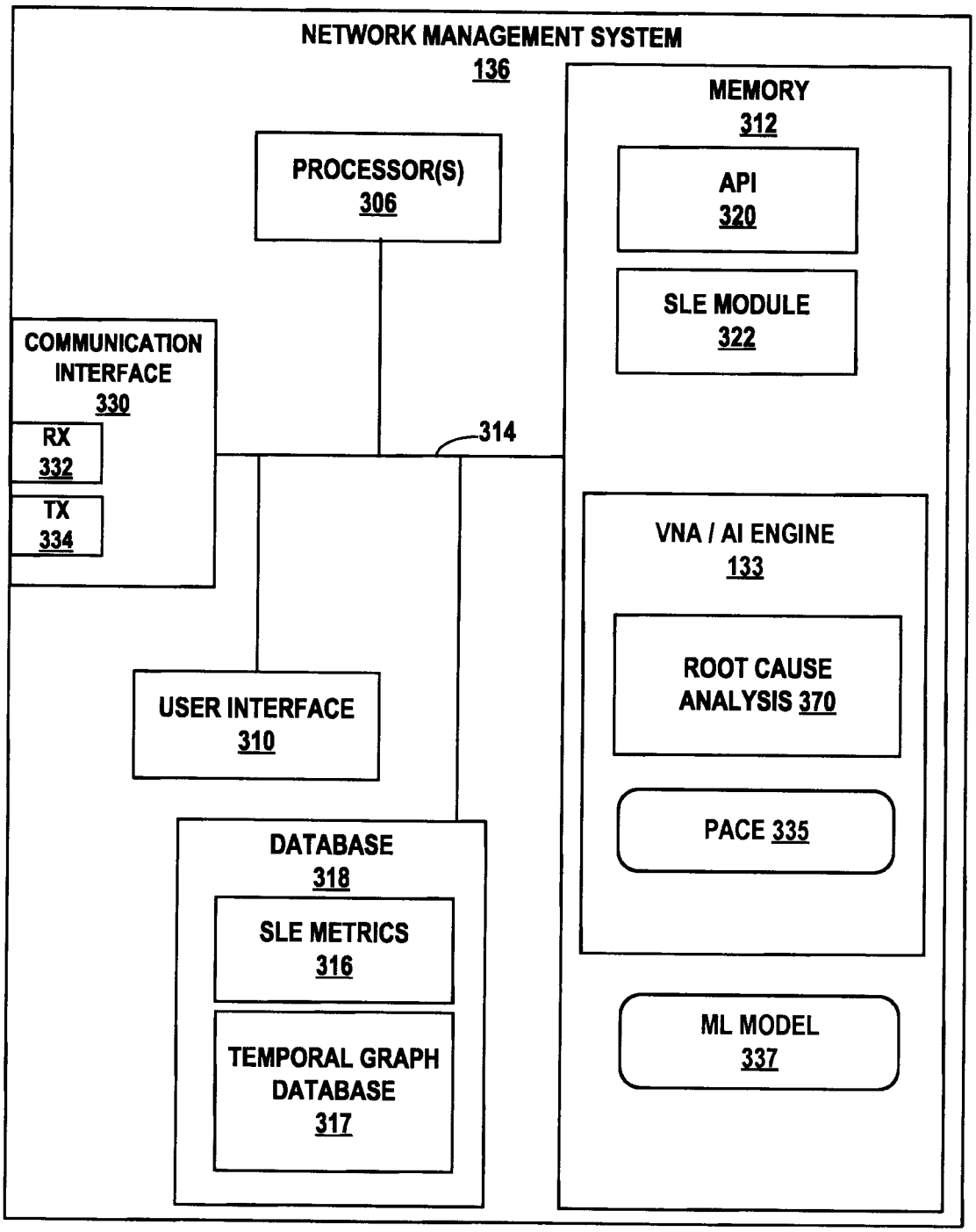
FIG. 3 is a block diagram illustrating an example network management system (NMS) configured in accordance with one or more techniques of this disclosure.

FIG. 3 is a block diagram illustrating example network management system (NMS) 136 configured in accordance with one or more techniques of this disclosure. NMS 136 may be used to implement, for example, NMS 136 in FIG. 1 or NMS 136 in FIG. 2. In such examples, NMS 136 is responsible for monitoring and management of one or more of network devices 13 of FIG. 1 or network devices 13 of FIG. 2. In this example, NMS 136 receives data collected from network devices 13 by cloud-based WAN assurance endpoint terminator 134, such as telemetry data, SLE metrics, and/or traffic metrics including application usage data, and health information, and analyzes the data for cloud-based WAN assurance of a network containing network devices 13. In some examples, NMS 136 may be part of another server shown in FIG. 1 or a part of any other server.

In some examples, in addition to monitoring network devices 13, NMS 136 is also responsible for monitoring and management of one or more wireless networks (not shown), in addition to monitoring network devices of service provider or other networks. In this example, NMS 136 also receives data collected by access points from user equipment, such as data used to calculate one or more SLE metrics, and analyzes this data for cloud-based management of the wireless networks. In this manner, a single NMS 136 can be used for management of both network devices 13, which may include virtualized network devices (e.g., software-based routers executing on a virtual machine or container), and wireless networks, for an end-to-end WAN assurance system viewable via a single cloud-based WAN assurance portal.

NMS 136 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface.

Communications interface 330 couples NMS 136 to a network and/or the Internet, such as any of network(s) 4, 6, 7, 11, 12, 20, and 22, as shown in FIG. 1, and/or any wide area networks or local area networks. Communications interface 330 includes a receiver 332 and a transmitter 334 by which NMS 136 receives/transmits data and information to/from any of network devices 13 and/or any other devices or systems forming part of WAN 7 such as shown in FIG. 1. The data and information received by NMS 136 may include, for example, SLE-related or event log data received from network devices 13 and used by NMS 136 to remotely monitor the performance of network devices 13 and WAN 7. In some examples, NMS 136 may further transmit data via communications interface 330 to any of network devices 13 to remotely manage WAN 7.

Memory 312 includes one or more devices configured to store programming modules and/or data associated with operation of NMS 136. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 220, an SLE module 322, a virtual network assistant (VNA)/AI engine 133, a root cause analysis module 370, and upgrade planning unit 135. NMS 136 may also include any other programmed modules, software engines and/or interfaces configured for remote monitoring and management of network devices 13, including remote monitoring and management of any of network devices 13. NMS 136 may also include any other programmed modules, software engines and/or interfaces configured for remote monitoring and management of wireless networks, including remote monitoring and management of any of access points.

SLE module 322 enables set up and tracking of thresholds for SLE metrics for each network 102. SLE module 322 further analyzes SLE-related data collected by network devices 13. For example, cloud-based WAN assurance endpoint terminator(s) 134 collect SLE-related data from network devices 13 currently connected to WAN 7. This data is transmitted to NMS 136, which executes by SLE module 322 to determine one or more SLE metrics for each of network devices 13 that have been onboarded to cloud-based WAN assurance system 130. The SLE metrics track whether the service level meets the configured threshold values for each SLE metric. Each metric may further include one or more classifiers. If a metric does not meet the SLE threshold, the failure may be attributed to one of the classifiers to further determine where the failure occurred. SLE metrics may include, for example, packet loss, jitter, latency, end-to-end processing time, and other user/device experience metrics such as WAN Link Health, Application Experience, and Gateway health.

VNA/AI engine 133 analyzes data received from network devices 13 as well as its own data to identify when undesired to abnormal states are encountered within WAN 7, such as within network devices 13. For example, VNA/AI engine 133 may use root cause analysis module 370 to identify the root cause of any undesired or abnormal states. In some examples, root cause analysis module 370 utilizes artificial intelligence-based techniques to help identify the root cause of any poor SLE metric(s) occurring within WAN 7. In addition, VNA/AI engine 133 may automatically invoke one or more corrective actions intended to address the identified root cause(s) of one or more poor SLE metrics. Examples of corrective actions that may be automatically invoked by VNA/AI engine 133 may include, but are not limited to, invoking API 320 to reboot one or more network devices 13. The corrective actions may further include restarting a switch and/or a router, invoke downloading of new software to a network device, switch, or router, etc. These corrective actions are given for example purposes only, and the disclosure is not limited in this respect. If automatic corrective actions are not available or do not adequately resolve the root cause, VNA/AI engine 133 may proactively provide a notification including recommended corrective actions to be taken by IT personnel to address the network error.

Temporal graph database 317 is configured to store connectivity and entity information of the network, which is extracted from historical telemetry data that NMS 300 collects from client devices 148, APs 142, switches 146, and/or other network nodes within network 134 at an application session-level granularity over an extended period of time, e.g., weeks or months. In accordance with the techniques of the disclosure, temporal graph database 317 further includes third-party data 52 as described in more detail below.

The connectivity information may represent different kinds of connections, including wireless, wired, and logical links such as peer paths or IPsec tunnels for SD-WAN devices, e.g., routers 187 of SD-WAN 177 from FIG. 1B. The entity information may represent different kinds of network devices, including client devices, AP devices, switches, other network nodes such as routes and gateways, and third-party network devices as well as applications running on the network devices. NMS 300 uses the connectivity and entity information at the application session-level to update temporal graph database 317, where the graph is representative of the network topology at the application session-level over the period of time.

An application session comprises a user session with the application, e.g., a VOIP or video conference call, a streaming video viewing session, or a gaming session. The application session may include multiple application flows (e.g., 10s to 100s of application flows) that each comprise a network level flow between network devices (e.g., defined by a 5-tuple) during the application session. For example, during an hour long VOIP call, a client device running the application may connect to multiple different AP devices (e.g., if the client device is moving during the session) and generate multiple application flows of the application session. In addition, each of the AP devices may connect to one or more switches, routers, and/or gateways up to the cloud-based application server, where each new connection may comprise another application flow of the application session.

Root cause analysis 370 correlates the multiple application flows of the identified application session and uses the application flow data to determine a subset of network devices within the network that were associated with the application session over the duration of the application session. Root cause analysis 370 then obtains the connectivity and entity information from temporal graph database 317 for all of the AP devices, switches, routers and/or gateways, and the cloud-based application server to which the client device running the application was connected over the duration of the application session.

Root cause analysis 370 may build an application-session specific topology for the application session based on the entity and connectivity information for the application session obtained from temporal graph database 317. In this way, the disclosed techniques enable backward-looking troubleshooting of the application session, even if a current network topology has changed after the particular application session concludes or if a current application session does not experience the same issues as the particular application session.

Root cause analysis 370 may further enable troubleshooting of the application session by identifying connectivity issues at one or more of a subset of network devices involved with the particular application session over the duration of the particular application session. For example, root cause analysis 370 analyzes network data 316 of the subset of network devices involved with the particular application session to identify root causes of the connectivity issues at one or more of the subset of network devices involved with the particular application session. More specifically, root cause analysis 370 may analyze event data included in or derived from network device 316 to determine whether connectivity issues are present. In some scenarios, root cause analysis 370 may apply at least a portion of network data 316 to ML model 380 to determine root causes of the connectivity issues.

PACE 335 of the virtual network assistant may, in some examples, dynamically construct, train, apply and retrain unsupervised ML model(s) 337 to event data (SLE metrics 316) to determine whether the collected network event data represents anomalous behavior that needs to be further analyzed by root cause analysis module 370 of VNA/AI engine 133 to facilitate identification and resolution of faults.

PACE 335 may then apply the ML model to data streams and/or logs of newly collected data of various network event types (e.g., statistics, messages, SLE metrics or the like, herein referred to as "PACE" event data of event type) to detect whether the currently observed network event data with the stream of incoming data is indicative of a normal operation of the system or whether the incoming network event data is indicative of a non-typical system behavior event or trend (e.g., anomaly) corresponding to a malfunctioning network that requires mitigation.

When the application of the ML model by the proactive analytics and correlation engine to the network event data indicates that there is a non-typical system behavior event or trend, NMS 136 may invoke a more complex root cause network analytics component of the virtual network assistant (VNA) to identify a root cause of the anomalous system behavior and, if possible, trigger automated or semi-automated corrective action. In this way, PACE 335 may construct and apply a ML model based on the particular complex network in which PACE 335 is deployed to determine whether to perform further, resource-intensive analysis on incoming streams of network event data collected (e.g., in real-time) from elements within the complex network system.

Further, along with identifying which issues require attention, some examples described herein may be configured to monitor messages exchanged within the complex network system as well as numerous operational counters, and statistics. During normal operation, the ratios between the values of different counters and statistics can assume values within a specific range of acceptable values, referred to herein as {Min, Max} range.

In accordance with the techniques described herein, VNA 133 of NMS 136 performs QoS monitoring and troubleshooting of user experience issues occurring outside of WAN 7 managed by NMS 136 using third-party data 52 obtained from one or more third-party monitoring vendors 50.

With respect to the "first mile" of the user application experience, NMS 126 integrates with third-party APM vendors 50 to obtain third-party data 52 from the SaaS application service nodes 10 during an application session between a client or subscriber device 16 and the SaaS application service node 10. In this example, the third-party data 52 is associated with how the client or subscriber device 16 is behaving during the application session. For example, third-party APM vendor 50 generates third-party data 52 regarding a third-party service or application. For example, third-party APM vendor 50 may collect user experience information 56 from a user of the third-party service or application provided by service nodes 10. In some examples, third-party APM vendor 50 provides a website with which a user or subscriber devices 16 may send reports 56 of user experience issues with a service provided by service nodes 10, such as a service outage, a network connectivity issue, etc. As another example, third-party APM vendor 50 may conduct direct performance measurement of third-party service or applications provided by service nodes 10 to obtain performance measurement data 54 of the third-party service or applications. In some examples, third-party APM vendor 50 may perform "speed testing," by measuring characteristics of a network or service performance of service nodes 10, such as latency, bandwidth, jitter, delay, response time, etc.

In some examples, third-party data 52 may include other usage metrics of the application, such as CPU usage on the client device 16, portion of CPU usage associated with the SaaS application service node 10, which Wi-Fi radio used by the client device 16, peripherals (e.g., headphones, speaker, camera) used by client device 16, which version of software is used by the client device 16, the OS of client device 16, etc.

In some examples, third-party data 52 includes low-level application details. In an example where the application is a video conferencing application, such low-level application details may include application-specific bandwidth usage by an audio call; jitter and/or latency comparisons across audio, video, or screen share calls from particular user, a third-party APM vendor 50, or a SaaS application server 10. In some examples, third-party data 52 may be divided across modalities, e.g., audio, video, or screen-share modalities. As discussed in more detail below, NMS 136 may determine whether SLA requirements of the network are met based on the low-level application details.

For example, third-party APM vendor 50 generates third-party data 52 regarding a third-party service or application. For example, third-party APM vendor 50 may collect user experience information 56 from a user of the third-party service or application provided by service nodes 10. In some examples, third-party APM vendor 50 provides a website with which a user or subscriber devices 16 may send reports 56 of user experience issues with a service provided by service nodes 10, such as a service outage, a network connectivity issue, etc. For example, third-party APM vendor 50 may receive, from a user of client or subscriber devices 16, user feedback data on a particular application session of the SaaS application servers. In some examples, the user feedback data may be, e.g., a rating on a one-to-five "star" rating scale, another rating value, or comments and description of what went wrong with a particular call or session. NMS 136 may receive such user feedback data from third-party APM vendor 50. Thereafter, NMS 136 may use the user feedback data to identify the problematic application session, and use network data 58 associated with the problematic application session as part of a root cause analysis of the entire network, as discussed in further detail below.

As another example, third-party APM vendor 50 may conduct performance measurement of third-party service or applications provided by service nodes 10 so as to obtain performance measurement data 54 of the third-party service or applications. In some examples, third-party APM vendor 50 may perform "speed testing," by measuring characteristics of a network or service performance of service nodes 10, such as latency, bandwidth, jitter, delay, response time, etc.

Root cause analysis 370 obtains third-party data 52 of a third-party application server or third-party service provider server from third-party APM vendor 50. In some examples, root cause analysis 370 may use one or more APIs to query third-party APM vendor 50 for data 52. In some examples, root cause analysis 370 obtains third-party data 52 from third-party APM vendor 50 using a "pull" or "push" request methodology.

Root cause analysis 370 identifies a user experience issue indicated by the third-party data 52. For example, root cause analysis 370 may identify a user experience issue based on a determination that one or more users of subscriber devices 16 have submitted reports 56 indicative of an issue with a third-party service provided by third-party service nodes 10. As another example, root cause analysis 370 may identify a user experience issue based on a determination that one or more metrics of third-party service nodes 10 indicated by third-party data 52 fail to meet one or more performance requirements established by one or more SLAs.

In response to identifying a user experience issue indicated by third-party data 52, root cause analysis 370 obtains, via endpoint terminator 134, network data 58 received from network devices 13. For example, root cause analysis 370 may determine a time at which the user experience issue indicated by third-party data 52 occurred, and obtain network data 58 prior to, during, and after the time at which the user experience issue indicated by third-party data 52 occurred. In some examples, root cause analysis 370 may obtain data from during predetermined time span prior to and after the time at which the user experience issue indicated by third-party data 52 occurred. In some examples, the predetermined time may be 1 second, 1 minute, 10 minutes, 30 minutes, 1 hour, 1 day, etc.

Root cause analysis 370 stitches (or fuses) third-party data 52 to the obtained network data 58 received from network devices 13. For example, root cause analysis 370 stitches third-party data 52 obtained from third-party APM vendors 50 of the service provider network of the ISP and/or the SaaS application service nodes 10 to network and telemetry data 58 received from network devices 10 within WAN 7 managed by NMS 136. For example, root cause analysis 370 may create a log for the user experience issue that includes both the third-party data 52 and the network data 58.

In some examples, root cause analysis 370 processes at least network data 58 to determine a root cause of the user experience issue. For example, based on stitches third-party data 52 obtained from third-party APM vendors 50, root cause analysis 370 may learn of a user experience issue. Additionally or in the alternative, root cause analysis 370 processes at least network data 58 to further determine to a remedial action of the user experience issue. In some examples, root cause analysis 370 processes both third-party data 52 and network data 58 to determine the root cause or remedial action of the user experience issue. In some examples, root cause analysis 370 uses temporal graph database 317 built based on telemetry of WAN 7 (e.g., or other networks managed by NMS 136) to determine where the problem occurred on the full network 2 and how the problem can be remediated, e.g., provided as a customer insight or conversational assistant action.

For example, root cause analysis 370 may determine, based on network data 58, that a root cause of the user experience issue is due to degraded performance or failure of a service provided by, e.g., service node 10A. In response to the determination, root cause analysis 370 may determine a remedial action is to select a different interface of router 8 with which to forward traffic of subscriber devices 16 such that a different service node, such as service node 10B, is used to provide the service to subscriber devices 16.

As another example, root cause analysis 370 may determine, based on network data 58, that a root cause of the user experience issue is due to degraded performance or failure of a service provider network of an ISP providing connectivity through transit network 22 to service node 10A. In response to the determination, root cause analysis 370 may determine a remedial action is to cause router 8 to forward traffic of subscriber devices 16 via a different service provider network (e.g., such that the traffic of subscriber devices 16 passes through a different transit network 22) so as to avoid the problematic service provider network.

Virtual network assistant 133 generates a notification for presentation to an administrator device which identifies the root cause or the remedial action of the user experience issue. In this fashion, virtual network assistant 133 may enable troubleshooting, identification, and resolution of the user experience issue, even where the root cause of the user experience issue occurs outside of WAN 7 managed by NMS 136, such as where the root cause is located on one of subscriber devices 16 or third-party application service node 10 not managed by NMS 136.

Typically, a customer grants permission to NMS 136 to perform APM data source integration. As such, NMS 136 may not have permission to access APM data from third-party APM vendor 50 for every customer. However, if, for example, NMS 136 determines, based on APM information for a first customer, that an SaaS application service node 10 or a service provider network has issues, then NMS 136 may use this information to help troubleshoot user experience or application performance issues of other customers using the same application during a similar time period. For example, NMS 136 may use third-party APM data 52 for a first customer indicating issues accessing an SaaS server destination IP to assist in troubleshooting a second customer having issues accessing the same SaaS server destination IP.

In some examples, NMS 136 performs proactive third-party integration to actively monitor third-party performance. In response to detecting a user experience issue, NMS 136 proactively alerts users of the user experience issue using, e.g., conversational assistant actions. In the proactive example, NMS 136 proactively queries third-party APM vendors 50 for third-party data 52 of the service provider network of the ISP and/or the SaaS application service nodes 10. Additional detail of a conversational assistant for network management is described in U.S. Pat. No. 11,496,373, entitled "ENHANCED CONVERSATION INTERFACE FOR NETWORK MANAGEMENT," filed Jan. 26, 2021 and issued Nov. 8, 2022, the entire contents of which are incorporated by reference herein.

In some examples, NMS 136 performs integration with custom-applications that are hosted in an organization's datacenters. In contrast to public SaaS application servers, NMS 136 typically may not have visibility into private, custom applications. In some examples, NMS 136 is integrated with a data center management system to gain insights data of the custom-application. Additional detail of a data center management system is described in U.S. Pat. No. 10,756,983, entitled "Intent-based Analytics," filed Jul. 24, 2018 and issued Aug. 25, 2020, and U.S. Pat. No. 10,992,543, entitled "Automatically generating an intent-based network model of an existing computer network," filed Mar. 21, 2019 and issued Apr. 27, 2021, the entire content of each of which is incorporated by reference herein.

In this way, NMS 136 provides a single pane of glass to present information to administrators regardless of the source of the data. Expanding the collection of data to those devices and services outside of WAN 7 managed by NMS 136 provides additional potential components that may be the root case of a detected network problem. In addition, the third-party application client data 52 provides information on the user-perceived judgement of the quality of particular application sessions or calls, which is beneficial in identifying user experience issues.

Using the co-relation of the telemetry data from wireless, wired and SD-WAN along with third-party data 52 obtained from third-party APM vendors 50, NMS 136 has a full view of: (1) what happened (e.g., via user feedback and/or analysis by NMS 136); (2) when it happened (e.g., via third-party data 52); (3) where it happened (e.g., via analysis by NMS 136); (4) why it happened (e.g., via analysis by NMS 136); and (5) how to remediate the issue (e.g., via the conversational assistant or remedies identified by NMS 136). Therefore, an NMS as described herein may stitch third-party data 52 received from third-party APM vendors 50 to WAN 7 managed by NMS 136 to provide full client-to-cloud monitoring and/or troubleshooting, including the first mile and the last mile of user experience. An NMS as described herein therefore may expand its collection of data to those devices and services outside of a WAN (and other networks managed by the NMS, such as client WLANs), so as to enable the NMS to gain insight on additional potential components that may be the root case of a detected network problem and to enable true client-to-cloud monitoring and troubleshooting.

Figure 4:
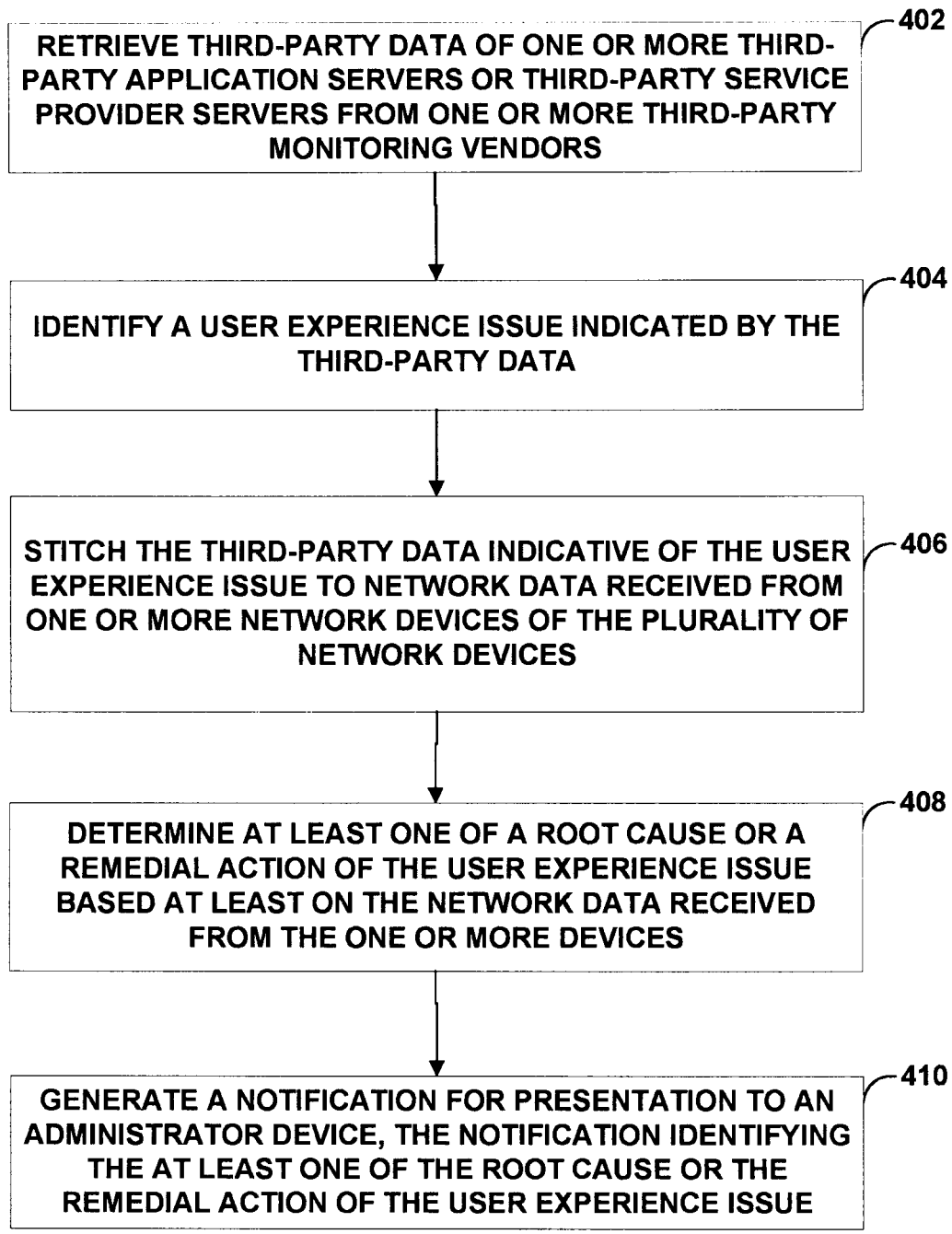
FIG. 4 is a flowchart illustrating an example operation in accordance with the techniques of the disclosure.

FIG. 4 is a flowchart illustrating an example operation in accordance with the techniques of the disclosure. Specifically, FIG. 4 depicts an example operation for identifying a user experience issue from third-party data 52 obtained from third-party APM vendors 50 and using at least network data 58 to determine at least one of a root cause or a remedial action for the user experience issue. FIG. 4 is described with respect to FIG. 1 for convenience. However, the operation of FIG. 4 may be additionally be implemented using cloud-based WAN assurance system 130 of FIG. 2 or NMS 136 of FIG. 3.

As depicted in the example of FIG. 4, third-party APM vendor 50 generates third-party data 52 regarding a third-party service or application. For example, third-party APM vendor 50 may collect user experience information 56 from a user of the third-party service or application provided by service nodes 10. As another example, third-party APM vendor 50 may conduct direct performance measurement of third-party service or applications provided by service nodes 10 so as obtain performance measurement data 54 of the third-party service or applications. NMS 136 obtained third-party data 52 of a third-party application server or third-party service provider server from third-party APM vendor 50 (402). In some examples, NMS 136 may use one or more APIs to query third-party APM vendor 50 for data 52.

NMS 136 identifies a user experience issue indicated by the third-party data 52 (404). For example, NMS 136 may identify a user experience issue based on a determination that one or more users of subscriber devices 16 have submitted reports 56 indicative of an issue with a third-party service provided by third-party service nodes 10. As another example, NMS 136 may identify a user experience issue based on a determination that one or more metrics of third-party service nodes 10 indicated by third-party data 52 fail to meet one or more performance requirements established by one or more SLAs.

In response to identifying a user experience issue indicated by third-party data 52, NMS 136 obtains network data 58 received from network devices 13. For example, NMS 136 may determine a time at which the user experience issue indicated by third-party data 52 occurred, and obtain network data 58 prior to, during, and after the time at which the user experience issue indicated by third-party data 52 occurred.

NMS 136 stitches (or fuses) third-party data 52 indicative of the user experience issue to the obtained network data 58 received from network devices 13 (406). For example, NMS 136 may create a log for the user experience issue that includes both the third-party data 52 and the network data 58. In some examples, NMS 136 determines at least one of a root cause of the user experience issue or a remedial action for the user experience action based on at least network data 58 (408). In some examples, NMS 136 processes both third-party data 52 and network data 58 to determine the root cause or remedial action of the user experience issue.

NMS 136 generates a notification for presentation to an administrator device which identifies the root cause or the remedial action of the user experience issue (410). In this fashion, NMS 136 may enable troubleshooting, identification, and resolution of the user experience issue, even where the root cause of the user experience issue occurs outside of WAN 7 managed by NMS 136, such as where the root cause is located on one of subscriber devices 16 or third-party application service node 10 not managed by NMS 136.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A network management system in communication with a plurality of network devices, the network management system comprising:
    a memory; and
    processing circuitry in communication with the memory and configured to:
        obtain third-party data of one or more third-party application servers or third-party service provider servers from one or more third-party monitoring vendors, the one or more third-party application servers or third-party service provider servers being outside of a network managed by the network management system;
        identify a user experience issue indicated by the third-party data, the user experience issue occurring outside of the network managed by the network management system;

stitch the third-party data indicative of the user experience issue to network data obtained for one or more network devices of the plurality of network devices;
determine, based at least on the stitched network data, at least one of:
a root cause of the user experience issue, the root cause occurring outside of the network managed by the network management system; or
a remedial action to perform within the network managed by the network management system to remediate the user experience issue occurring outside of the network managed by the network management system; and
generate a notification to an administrator device, the notification identifying the at least one of the root cause or the remedial action.

2. The network management system of claim 1, wherein to obtain the third-party data, the processing circuitry is configured to:
receive a request for troubleshooting of the user experience issue; and
in response to the request for troubleshooting of the user experience issue, query the one or more third-party monitoring vendors via one or more application programming interfaces (APIs) for the third-party data of the one or more third-party application servers or third-party service provider servers.

3. The network management system of claim 1, wherein to obtain the third-party data, the processing circuitry is configured to periodically query the one or more third-party monitoring vendors via one or more application programming interfaces (APIs) for the third-party data of the one or more third-party application servers or third-party service provider servers.

4. The network management system of claim 1,
wherein to obtain the third-party data, the processing circuitry is configured to query the one or more third-party monitoring vendors via one or more application programming interfaces (APIs) for third-party data of a particular third-party application server of the one or more third-party application servers or third-party service provider servers during an application session between a client device and the particular third-party application server, and
wherein the third-party data comprises data associated with a behavior of the client device during the application session.

5. The network management system of claim 1,
wherein to obtain the third-party data, the processing circuitry is configured to query the one or more third-party monitoring vendors via one or more application programming interfaces (APIs) for third-party data of a particular third-party application server of the one or more third-party application servers or third-party service provider servers after an application session between a client device and the particular third-party application server,
wherein the third-party data comprises user quality of service (QoS) data in the form of low-level application details.

6. The network management system of claim 1,
wherein to obtain the third-party data, the processing circuitry is configured to query the one or more third-party monitoring vendors via one or more application programming interfaces (APIs) for the third-party data of a particular third-party application server of the one or more third-party application servers or third-party service provider servers after an application session between a client device and the particular third-party application server, and
wherein the third-party data comprises user feedback data on the application session.

7. The network management system of claim 1, wherein the third-party data comprises insights data of one or more of a service provider network of an Internet Service Provider (ISP), a Software-as-a-Service (SaaS) application service, or a custom application hosted in a datacenter of the one or more third-party monitoring vendors.

8. The network management system of claim 1, wherein the processing circuitry is further configured to obtain the network data from the one or more network devices of the plurality of network devices.

9. The network management system of claim 1, wherein the processing circuitry is configured to determine the at least one of the root cause or the remedial action of the user experience issue based at least on the network data obtained for the one or more network devices and the third-party data indicative of the user experience issue.

10. The network management system of claim 1,
wherein to obtain the third-party data, the processing circuitry is configured to query the one or more third-party monitoring vendors via one or more application programming interfaces (APIs) for third-party data of a particular third-party application server of the one or more third-party application servers or third-party service provider servers during an application session between a client device and the particular third-party application server,
wherein the processing circuitry is configured to determine the root cause of the user experience issue based at least on the network data obtained for the one or more network devices, and
wherein the root cause is due to a problem with at least one of the client device or the particular third-party application server.

11. A method comprising:
obtaining, by a network management system in communication with a plurality of network devices, third-party data of one or more third-party application servers or third-party service provider servers from one or more third-party monitoring vendors, the one or more third-party application servers or third-party service provider servers being outside of a network managed by the network management system;
identifying, by the network management system, a user experience issue indicated by the third-party data, the user experience issue occurring outside of the network managed by the network management system;
stitching, by the network management system, the third-party data indicative of the user experience issue to network data obtained for one or more network devices of the plurality of network devices;
determining, by the network management system and based at least on the stitched network data, at least one of:
a root cause of the user experience issue, the root cause occurring outside of the network managed by the network management system; or
a remedial action to perform within the network managed by the network management system to remediate the user experience issue occurring outside of the network managed by the network management system; and generating, by the network management system, a notification to an administrator device, the notification identifying the at least one of the root cause or the remedial action.

12. The method of claim 11, wherein obtaining the third-party data comprises:
receiving a request for troubleshooting of the user experience issue; and
in response to the request for troubleshooting of the user experience issue, querying the one or more third-party monitoring vendors via one or more application programming interfaces (APIs) for the third-party data of the one or more third-party application servers or third-party service provider servers.

13. The method of claim 11, wherein obtaining the third-party data comprises periodically querying the one or more third-party monitoring vendors via one or more application programming interfaces (APIs) for the third-party data of the one or more third-party application servers or third-party service provider servers.

14. The method of claim 11,
wherein obtaining the third-party data comprises querying the one or more third-party monitoring vendors via one or more application programming interfaces (APIs) for third-party data of a particular third-party application server of the one or more third-party application servers or third-party service provider servers during an application session between a client device and the particular third-party application server, and
wherein the third-party data comprises data associated with a behavior of the client device during the application session.

15. The method of claim 11,
wherein obtaining the third-party data comprises querying the one or more third-party monitoring vendors via one or more application programming interfaces (APIs) for third-party data of a particular third-party application server of the one or more third-party application servers or third-party service provider servers after an application session between a client device and the particular third-party application server,
wherein the third-party data comprises user quality of service (QoS) data in the form of low-level application details.

16. The method of claim 11,
wherein obtaining the third-party data comprises querying the one or more third-party monitoring vendors via one or more application programming interfaces (APIs) for the third-party data of a particular third-party application server of the one or more third-party application servers or third-party service provider servers after an application session between a client device and the particular third-party application server, and
wherein the third-party data comprises user feedback data on the application session.

17. The method of claim 11, wherein the third-party data comprises insights data of one or more of a service provider network of an Internet Service Provider (ISP), a Software-as-a-Service (SaaS) application service, or a custom application hosted in a datacenter of the one or more third-party monitoring vendors.

18. The method of claim 11, further comprising obtaining the network data received from the one or more network devices of the plurality of network devices.

19. The method of claim 11, wherein determining the at least one of the root cause or the remedial action of the user experience issue is based at least on the network data obtained for the one or more network devices and the third-party data indicative of the user experience issue.

20. A non-transitory, computer-readable medium comprising instructions that, when executed, are configured to cause processing circuitry of a network management system in communication with a plurality of network devices to:
obtain third-party data of one or more third-party application servers or third-party service provider servers from one or more third-party monitoring vendors, the one or more third-party application servers or third-party service provider servers being outside of a network managed by the network management system;
identify a user experience issue indicated by the third-party data, the user experience issue occurring outside of the network managed by the network management system;
stitch the third-party data indicative of the user experience issue to network data obtained for one or more network devices of the plurality of network devices;
determine, based at least on the stitched network data, at least one of:
a root cause of the user experience issue, the root cause occurring outside of the network managed by the network management system; or
a remedial action to perform within the network managed by the network management system to remediate the user experience issue occurring outside of the network managed by the network management system; and
generate a notification to an administrator device, the notification identifying the at least one of the root cause or the remedial action.

* * * * *